Feb. 8, 1938.  A. J. GRANBERG  2,107,441
AUTOMATIC SHUT-OFF FOR METERS
Filed Aug. 2, 1933  3 Sheets-Sheet 1
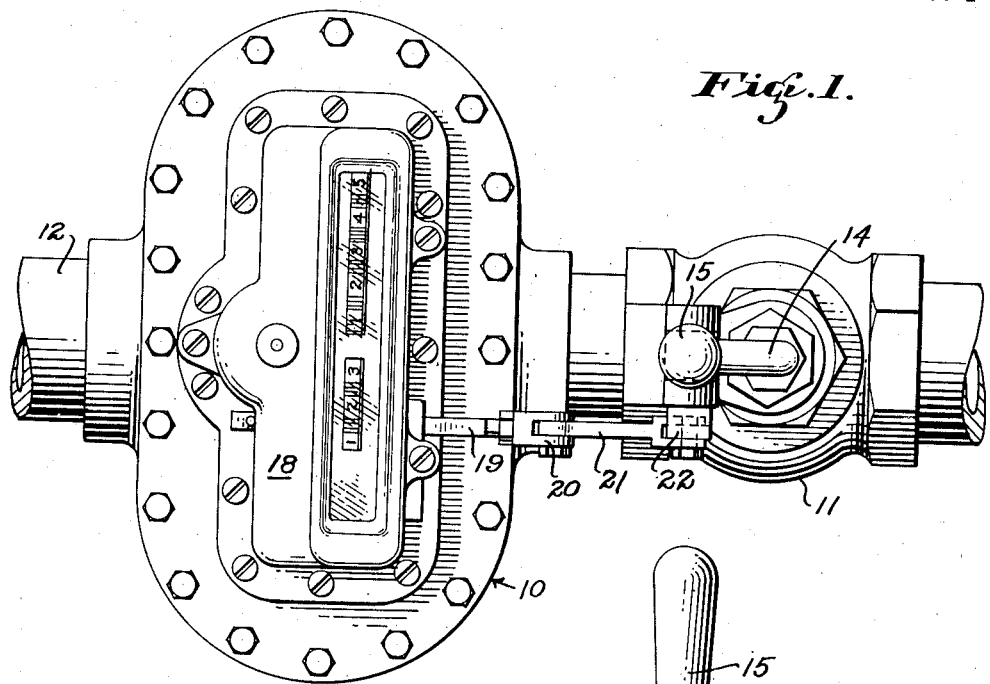
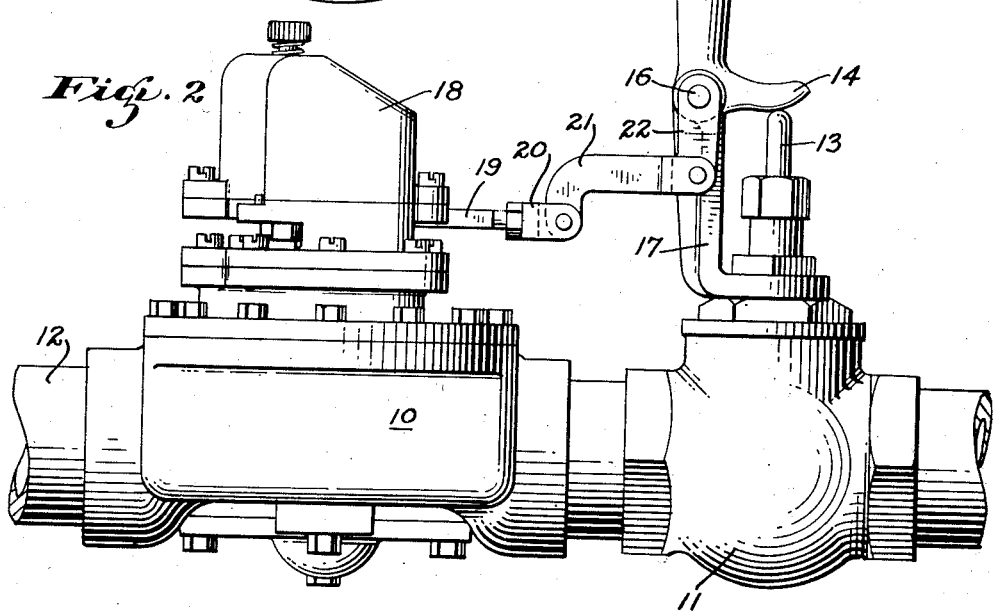
INVENTOR.
Albert J. Granberg
BY Townsend & Loftus
ATTORNEYS.

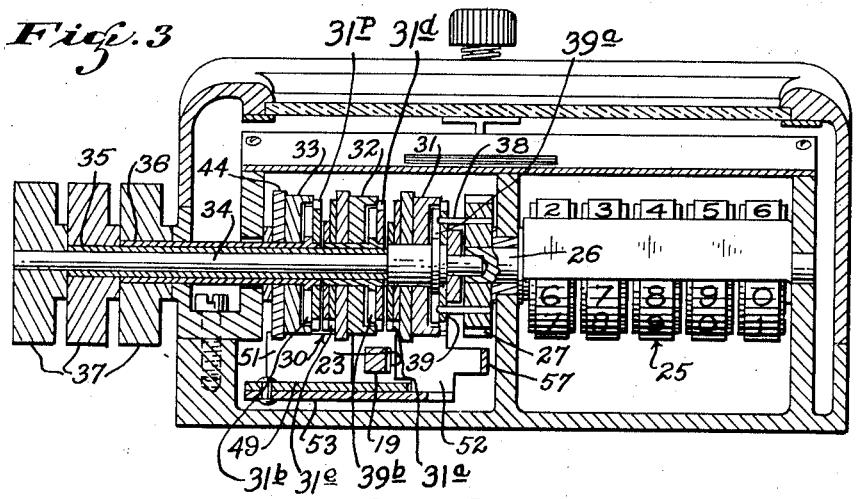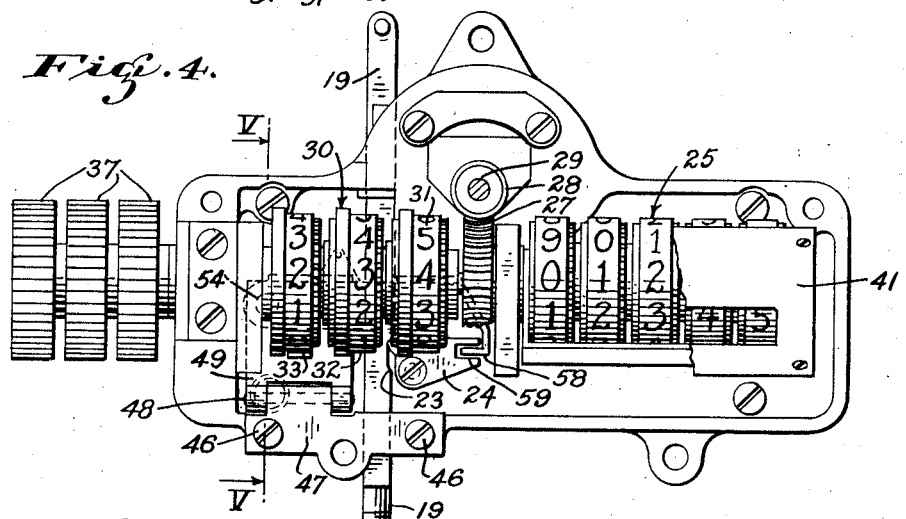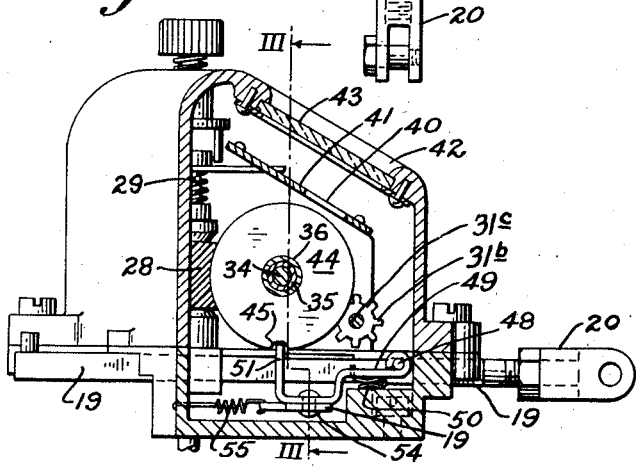

Feb. 8, 1938.    A. J. GRANBERG    2,107,441
AUTOMATIC SHUT-OFF FOR METERS
Filed Aug. 2, 1933    3 Sheets-Sheet 3

INVENTOR.
Albert J. Granberg
BY Townsend & Loftus
ATTORNEYS.

Patented Feb. 8, 1938

2,107,441

UNITED STATES PATENT OFFICE 2,107,441

AUTOMATIC SHUT-OFF FOR METERS

Albert J. Granberg, Berkeley, Calif., assignor to Ralph N. Brodie Company, Oakland, Calif., a corporation of California Application August 2, 1933, Serial No. 683,313

3 Claims. (Cl. 235—132)

This invention relates to liquid meters and shut off valves and is particularly concerned with means actuated by the operation of a liquid meter to close or permit closing of a valve controlling fluid flow through the meter when a predetermined quantity of liquid has been delivered.

Liquid meters are customarily employed for metering the quantity of liquid fuel delivered from a tank car or truck to a point of delivery, such as a storage tank or the like. The liquid meter is usually positioned at the outlet of the car or truck tank and a control valve is employed in conjunction with a delivery hose provided to lead to the point of delivery. A counting mechanism, forming a part of and operated by the meter, displays a visible dial upon which is indicated the number of gallons or other volumetric units that have passed through the meter. An operator must watch the counting mechanism and close the valve when the desired volume of liquid has been delivered. This system is undesirable in that accuracy of the volume of liquid delivered depends upon the attention of the operator and his ability to close the valve at precisely the right moment. Furthermore, it is often necessary for the operator to attend the delivery end of the hose and therefore inconvenient for him to observe the counting mechanism.

It is, therefore, the object of the present invention to provide a simple device for use with a meter and shut off valve that will cause said valve to be closed when a predetermined volume of liquid has passed through said meter, said device being so constructed that it may be set for any desired volume of fluid before the valve is opened and comprising means for visibly indicating the volume of fluid remaining to be delivered at all times during its operation, before the valve is closed.

One form of my invention is exemplified in the accompanying drawings and described in greater detail in the following specification in which further of its objects and advantages will be made apparent. In the drawings Fig. 1 is a plan view of a meter and valve assembly embodying my invention.

Fig. 2 is a side elevation of the same.

Fig. 3 is a central vertical section of the counting and presetting mechanism taken on line III—III of Fig. 5.

Fig. 4 is a plan view of the same with parts broken away to better disclose the counting mechanism.

Fig. 5 is a section taken on the line V—V of Fig. 4.

Figure 6:
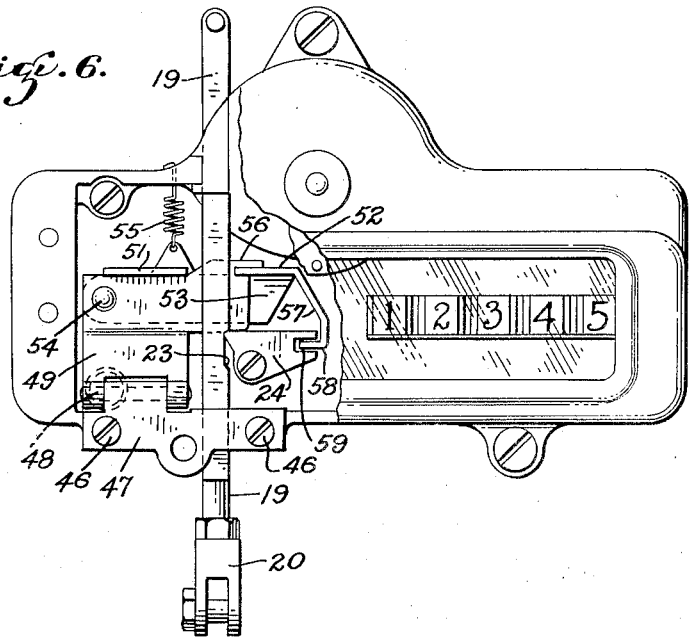
Fig. 6 is a plan view of the counting mechanism housing with a portion thereof broken away and a portion of the counting mechanism removed to expose the mechanism employed for permitting the shut off valve to close.

Referring more particularly to the drawings, Figs. 1 and 2 illustrate a meter and valve assembly in which a fluid meter 10 and a shut-off valve 11 are shown as connected in a fluid line indicated at 12. The valve 11 is of a standard type normally held in a closed position by means of an internal spring not shown in the drawings, and controls flow of fluid through the line 12, the volume of fluid permitted to flow by the valve 11 being measured in the meter 10.

The valve is opened by depression of a reciprocable stem 13 which extends through the bonnet of the valve, and depression of the stem 13 is effected by the foot 14 on a hand lever 15 fixed to a pin 16, which pin is supported for pivotal movement in a bracket 17. The valve is shown in open position in Figs. 1 and 2 of the drawings and it is seen that to open the valve, the member 15 is swung to the right, referring to Fig. 2, causing the portion 14 thereof to depress the valve stem 13 and open the valve against the flow of fluid.

A counting mechanism, to be more fully described hereinafter, is contained in a casing 18, suitably supported by the meter, and means within the casing 18 are employed for retaining the valve 11 in an open position until a predetermined volume of fluid has passed through the meter and been registered upon the counting mechanism. This is accomplished by a sliding bar 19 extending through the casing 18 of the counting mechanism, and connected by means of a clevis 20 and a link 21, with a lever 22 also fixed to the pin 16 which carries the valve-actuating lever 15. When the lever 15 is actuated to depress the stem 13 and open the valve, the rod 19 is caused, through the connections described, to slide through the casing 18. Means within the casing 18 lock the rod 19 in a position holding the valve 11 open and therefore fluid continues to flow through the meter and valve until the locking means is released and the valve permitted to close under the tension of its internal spring.

The locking means which holds the valve in its open position is illustrated in Fig. 6, wherein the sliding rod 19 is shown as provided with a notch 23, which notch is engaged by a pivoted pawl 24 to retain the rod 19 in its innermost position and hold the valve 11 open until engagement of the pawl 24 with the notch 23 is released. The mechanism for effecting this release is contained within the casing 18 and is actuated by movement of the meter 10.

Referring to Figs. 3, 4 and 5, the casing 18 is shown as containing a counting mechanism 25. The counting mechanism 25 is of conventional design and consists, as shown, of a plurality of dial wheels numbered on their exterior surfaces to indicate gallons or other units of volumetric measure. One of the dial wheels is positively driven through a central shaft 26, which shaft is rotated by a worm gear 27 in mesh with a worm 28 fixed to a shaft 29, which is rotated by operation of the meter 10 and extends from said meter upwardly into the housing 18 of the counting mechanism. The positively driven dial wheel is connected by a suitable star wheel mechanism with the next dial wheel, so that upon each complete rotation of the first wheel, the second wheel is caused to rotate the distance between adjacent numbers on its exterior surface. The third wheel is similarly connected with the second, and so on, so that the counting mechanism totalizes the number of gallons that have been measured by the meter.

Also arranged within the casing 18 and coaxial with the counting mechanism 25 is an auxiliary counter, generally indicated at 30. The auxiliary counter 30 consists of dial wheels 31, 32 and 33. The dial wheel 31 is fixed to a central shaft 34, while the dial wheels 32 and 33 are supported by hollow shafts 35 and 36, respectively, concentric with the central shaft 34 and rotatable with relation thereto. The outer end of the shaft 34 and the outer ends of each of the shafts 35 and 36 are fitted with finger wheels 37 so that the dial wheels 31, 32 and 33 may be rotated manually to cause them to indicate any desired volume of fluid. When the meter is in operation, the auxiliary counter 30 operates in the same manner as the conventional counter 25, the auxiliary counter being driven by pins 38 carried by the worm gear 27 and extending into a plate 39 which forms a part of one dial wheel on the auxiliary counter.

The units dial wheel 31, as explained, is driven by pins 38 carried by worm gear 27 which engage the plate 39. This plate carries pawls 39a which engage an internal ratchet within the dial wheel 31 so that the latter will be positively driven in one direction and will be free to be turned in the same direction by manipulation of the proper finger wheel 37. The units dial wheel 31 carries a mutilated gear 31a to engage a proper transfer pinion 31b on a longitudinal countershaft 31c, shown in Fig. 5. This pinion engages a transfer gear 31d adjacent the tens dial wheel 32, which gear carries pawls 39b engaging an internal ratchet in the dial wheel 32. The dial wheel 32 is provided with a mutilated gear 31e which engages a transfer pinion 31b on the shaft 31c which also engages a transfer gear 31f adjacent the hundreds dial wheel 33. This transfer gear 31f carries pawls 31h which engage an internal ratchet wheel in the hundreds dial wheel 33. The relation is such that when the dial wheel 31 imparts one complete revolution, it will, through its mutilated gear 31a, drive the tens dial wheel 32 one-tenth of a revolution through the transfer pinion 31b. When the tens dial wheel 32 moves a complete revolution, it will impart one-tenth revolution to the hundreds dial wheel 33 in the same manner. Due to the fact that these wheels are driven through a ratchet mechanism, they may be freely turned in one direction or in the direction necessary for presetting.

The numerals on the dial wheels of the auxiliary counter are arranged in a reverse order with respect to the numerals on the conventional counter, as shown in Fig. 4 of the drawings. Therefore, if it is desired to deliver 123 gallons of gasoline, the finger wheels 37 are manipulated to position the dial wheels of the auxiliary counter with the numbers 1, 2 and 3 visible through a sight-opening 40 in a plate 41 which overlies the counting mechanism, a window 42 provided with glass or other transparent material 43 being provided in the casing 18 directly above the plate 41. With the dial wheels of the auxiliary counter set to read "123", the counting mechanism begins to operate upon opening of the valve and flow of fluid through the meter. As the numbers upon the wheels are arranged in reverse order, they will gradually approach a reading of zero, which will indicate that exactly 123 gallons have passed through the meter. Upon the event of all three of the dial wheels of the auxiliary counter registering zero, means are employed for releasing the engagement of the pawl 24 with the notch 23, and consequently the valve 11 is permitted to close.

Figure 7:
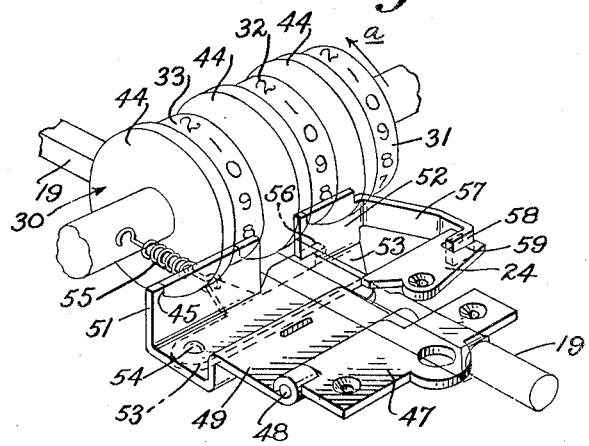
Fig. 7 is a perspective view of the mechanism employed to release the shut off valve.

The means for accomplishing the function last described are best illustrated in Figs. 5, 6 and 7 of the drawings. In Figs. 5 and 7, each of the dial wheels is shown as provided with a disc 44. The discs 44 are fixed to the dial wheels for rotation therewith and each disc is provided with a notch 45 so located that it will assume a downward position when the zero on the dial wheel is visible through the sight-opening 40. Therefore, when each of the dial wheels is in a position to display the zero, the notches 45 will be in alignment along the lower edges of the discs 44.

Fixed within the casing 18 by being clamped between separable halves of the casing and secured by means of screws 46 is a plate 47 supporting a pintle 48 upon which a plate 49 is supported for swinging movement in a vertical direction. The plate 49 is normally urged upwardly by a small spring 50 disposed between it and the bottom of the casing (see Fig. 5), and is provided with an up-turned edge 51 which rides on the periphery of the discs 44 and is adapted to be received by the notches 45 thereof when the dials register zero. The edge 51 is of a length sufficient to engage only the first two of the discs 44. The edge of the third disc 44 is, however, engaged by an up-turned member 52 carried by a plate 53, which plate underlies the plate 49 and is pivoted thereto by a pin 54. A spring 55 extends between the plate 53 and the casing wall and tends to move the plate 53 and member 52 rearwardly. A lug 56 formed on the plate 49 limits this rearward movement at a point maintaining the member 52 in alignment with the up-turned edge 51.

Referring to Fig. 7, the rotation of the dial wheels is in the direction of the arrow "a" and when all three of the dial wheels register zero, the plate 49 swings upwardly about the pintle 48 until the edge 51 thereof is received by the notches 45 in the first two discs 44, and the member 52 is likewise received by the notch in the third disc. The valve is still open and the meter is still operating so that the last dial wheel tends to continue its rotary motion in the direction of the arrow "a". Such motion is transmitted by means of the notch 45 on the third disc 44 and the member 52 to swing the plate 53 outwardly about its pivotal support 54. An arm 57 is carried by the member 52 and has its end 58 shaped to engage a notch 59 in the pawl 24, and consequently this swinging movement of the plate 53 about its pivot 54 causes pivoting of the pawl 24 in a clockwise direction, when viewing it in Fig. 7, to a position releasing its engagement with the notch 23 in the rod 19. When this release is effected, the rod 19 is free to slide through the housing of the counting mechanism and the valve 11 is permitted to close. The rod 19, of course, is moved when the valve is tripped by the pressure of the fluid and the valve spring against the valve member tending to move the stem 13 upwardly.

In operation, when it is desired that a certain volume of fluid be delivered through the meter 10, the auxiliary counting mechanism is first set by means of the finger wheels 37 to indicate the desired volume of fluid. The lever 15 is then actuated by swinging it in a clockwise direction, when viewing it as in Fig. 2, until it assumes the position in which it is illustrated in Fig. 2 to open the valve 11, and upon being so actuated causes the rod 19 to slide or move endwise to the left as shown in Fig. 2 through the housing 18 where it is latched by the pawl 24 in a position holding the valve 11 open. When fluid begins to flow through the meter, the auxiliary counter is operated in the manner described until the desired volume of fluid has passed through the meter, at which time each of the dial wheels on the auxiliary counter will register zero, and the notches 45 in the discs 44 will be in alignment in a position to receive the members 51 and 52 on the plates 49 and 53, respectively. Any further movement of the disc 44 on the last dial wheel causes it to swing the plate 53 about its pivot 54, with the result that the arm 57 will impart pivotal movement to the pawl 24 and release the rod 19, permitting the valve 11 to close and discontinue the fluid flow. The valve will immediately close due to the action of the fluid pressure and the valve spring against the valve member, both of which tend to move the valve member toward its seat. It is seen that the pawl 24 may be moved out of engagement with the notch 23 of the rod 19 due to the eccentric position of the point on the pawl 24 which engages the end shoulder of the notch 23. This is most clearly shown in Fig. 6.

From the foregoing it is apparent that I have provided a device of novel kind which may be used in connection with a fluid meter and valve to lock the valve in an open position and release the valve permitting it to close when a predetermined volume of fluid has passed through the meter.

While I have shown a preferred form of my invention, it should be understood that the disclosure thereof is for purposes of illustration only, and that various changes may be resorted to in the construction and arrangement of the several parts described within the scope of the appended claims.

Having thus described my invention, what I claim and desire to secure by Letters Patent is:

1. In a mechanism of the character described, latching means, a plurality of rotatable discs, each of said discs having a notch in its edge, and a member associated with said latching means and movable into said notches when they are in alignment, a portion of said member being movable upon further movement of one of said discs to release said latching means.

2. A device of the character described including a counting mechanism consisting of rotatable dial wheels and a spring-actuated device, latching means for latching said device in one position, a disc having a notch in its edge fixed to each of said dial wheels, said discs being arranged to rest with said notches in alignment when a predetermined reading of said dial wheels is reached, a plate associated with said latching means and pivoted adjacent said counter and having an edge positioned to swing into said notches when they are aligned, a pivotal member carried by said plate to be actuated by movement of one dial wheel after said edge has been received by said notches to release said latching means.

3. In a mechanism of the character described, a counting mechanism consisting of dial wheels rotatable in a counting operation and a spring-actuated controlling device, means for latching said device in one position, a disc having a notch in its edge fixed to each of said dial wheels, said discs being arranged to rest with said notches in alignment when a predetermined count is reached and said device is to be unlatched, a member having an edge movable into said notches when they are aligned, a portion of said edge being supported for swinging movement upon further movement in the counting operation of the disc engaged by it, and means whereby said swinging movement will release said latching means.

ALBERT J. GRANBERG.